(12) United States Patent
Clyde et al.

(10) Patent No.: US 10,453,031 B2
(45) Date of Patent: Oct. 22, 2019

(54) SPATIOTEMPORAL ACTIVITY RECORDS

(71) Applicant: Snapp Studios, LLC, North Logan, UT (US)

(72) Inventors: Stephen Wright Clyde, North Logan, UT (US); David Allan Clyde, Providence, UT (US); Brian G. Smith, Wellsville, UT (US); Brandon Michael Ripplinger, Centerville, UT (US)

(73) Assignee: SNAPP STUDIOS, LLC, North Logan, UT (US)

( * ) Notice: Subject to any disclaimer, the term of this patent is extended or adjusted under 35 U.S.C. 154(b) by 749 days.

(21) Appl. No.: 14/846,264

(22) Filed: Sep. 4, 2015

(65) Prior Publication Data

US 2016/0071057 A1 Mar. 10, 2016

Related U.S. Application Data

(60) Provisional application No. 62/046,707, filed on Sep. 5, 2014.

(51) Int. Cl.
*G06Q 10/10* (2012.01)
*G06Q 50/20* (2012.01)
*G08G 1/00* (2006.01)
*G09B 19/16* (2006.01)

(52) U.S. Cl.
CPC ........... *G06Q 10/10* (2013.01); *G06Q 50/205* (2013.01); *G08G 1/20* (2013.01); *G09B 19/167* (2013.01)

(58) Field of Classification Search
CPC ........ G06Q 10/10; G06Q 50/205; G08G 1/20; G09B 19/167
See application file for complete search history.

(56) References Cited

U.S. PATENT DOCUMENTS

| | | | |
|---|---|---|---|
| 7,308,581 B1 * | 12/2007 | Geosimonian | G06F 21/32 713/182 |
| 8,915,738 B2 * | 12/2014 | Mannino | G09B 9/052 434/236 |
| 9,633,490 B2 * | 4/2017 | Sahinoglu | G01S 19/42 |

(Continued)

OTHER PUBLICATIONS

Brown, Roger. Train to gain. Commercial Motor; Dec. 9, 2010; 213, 5411; ProQuest p. 26 (Year: 2010).*

*Primary Examiner* — Amanda C Abrahamson
(74) *Attorney, Agent, or Firm* — Maschoff Brennan

(57) ABSTRACT

A method of creating spatiotemporal activity records for an education program may include determining a start of an activity. The method may additionally include tracking the activity to record at least one accomplishment or error achieved in the activity and at least one time/location indicator associated with the at least one accomplishment or error. The method may additionally include generating a spatiotemporal activity record that includes the at least one time/location indicator and the at least one accomplishment or error. The method may additionally include presenting at least a portion of the spatiotemporal activity record for review by a reviewer, receiving identification data of the reviewer as an indication that the reviewer has reviewed and understands the at least the portion of the spatiotemporal activity record, authenticating the reviewer as a service receiver, and verifying the spatiotemporal activity record as reviewed and approved by the service receiver.

20 Claims, 10 Drawing Sheets

(56) References Cited

U.S. PATENT DOCUMENTS

| | | | | |
|---|---|---|---|---|
| 10,189,479 B2* | 1/2019 | Innes | ............... | B60W 40/09 |
| 2003/0073065 A1* | 4/2003 | Riggs | ............... | G09B 5/00 |
| | | | | 434/350 |
| 2008/0114838 A1* | 5/2008 | Taylor | ............... | G06Q 10/107 |
| | | | | 709/206 |
| 2008/0254417 A1* | 10/2008 | Mohamed | ............... | G09B 9/04 |
| | | | | 434/69 |
| 2009/0125427 A1* | 5/2009 | Atwood | ............... | G06Q 20/10 |
| | | | | 705/35 |
| 2010/0055649 A1* | 3/2010 | Takahashi | ............... | B60W 50/082 |
| | | | | 434/66 |
| 2013/0209968 A1* | 8/2013 | Miller | ............... | B60R 16/0236 |
| | | | | 434/65 |
| 2014/0006280 A1* | 1/2014 | Scipioni | ............... | G06Q 20/322 |
| | | | | 705/44 |
| 2014/0017641 A1* | 1/2014 | Nowacki | ............... | G06Q 10/0639 |
| | | | | 434/219 |
| 2014/0272810 A1* | 9/2014 | Fields | ............... | G09B 19/14 |
| | | | | 434/65 |
| 2014/0302476 A1* | 10/2014 | Sorensen | ............... | G09B 7/00 |
| | | | | 434/307 R |
| 2015/0088738 A1* | 3/2015 | Cateland | ............... | G06Q 20/227 |
| | | | | 705/41 |
| 2015/0235214 A1* | 8/2015 | Bonsall | ............... | G06Q 20/4012 |
| | | | | 705/72 |

* cited by examiner

SPATIOTEMPORAL ACTIVITY RECORDS

CROSS-REFERENCE TO RELATED APPLICATIONS

This application claims the benefit of priority of U.S. Provisional Application No. 62/046,707, entitled "Spatiotemporal Activity Records" filed Sep. 5, 2014. The entirety of the foregoing application is incorporated herein by reference.

FIELD

Some embodiments described herein generally relate to managing, coordinating, tracking, and archiving of training activities in education programs.

BACKGROUND

Unless otherwise indicated herein, the materials described herein are not prior art to the claims in the present application and are not admitted to be prior art by inclusion in this section.

For training, licensing, and certification programs, such as driver education programs, there may be an increasing need for a program to provide documents that verify various instructions, practicing of skills, recitations, and competency demonstrations for the program actually take place and that program requirements have been met. It may be a challenge to collect and manage program-related information for providing such documents.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to techniques for managing, coordinating, tracking, and archiving of training activities in education programs.

In an example embodiment, a method of creating spatiotemporal activity records for an education program is described. The method may include the generation of spatiotemporal activity records that each capture start and end of an activity and time/location indicators throughout the activity for each student involved in a training activity. The method may additionally include tracking the activity to record at least one accomplishment achieved in or error made during the activity and a time/location indicator associated with each accomplishment or error. The method may additionally include presenting at least a portion of the spatiotemporal activity record for review by a reviewer, receiving identification data of the reviewer as an indication that the reviewer has reviewed and understands the at least the portion of the spatiotemporal activity record, authenticating the reviewer as a service receiver, and verifying the spatiotemporal activity record as reviewed and approved by the service receiver.

Other example embodiments include corresponding methods, systems, apparatus, and computer program products for these and other innovative aspects.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1A:
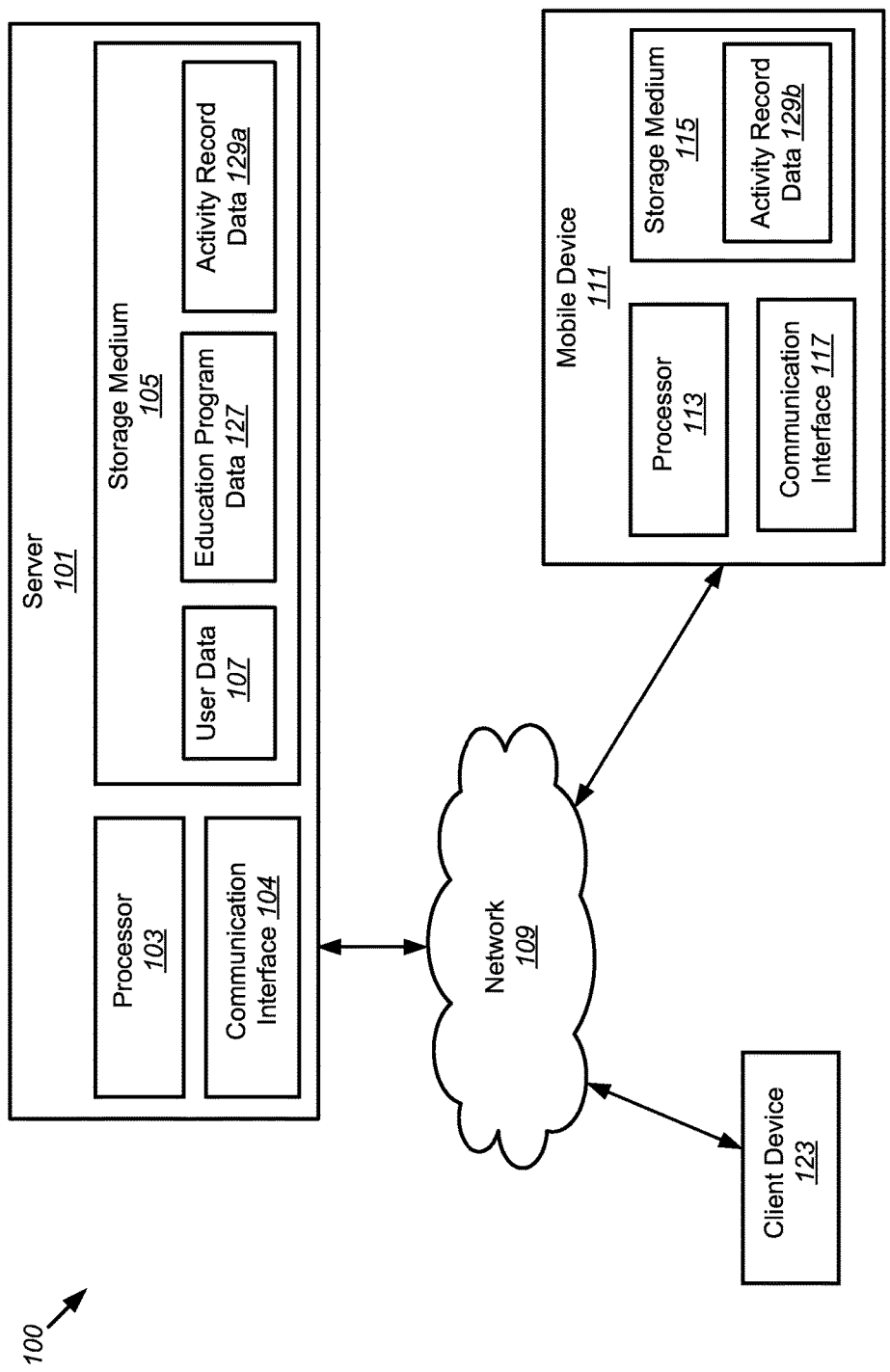
FIG. 1A is a block diagram of an example operating environment that includes a mobile device and a server.

Embodiments described herein generally relate to techniques for managing, coordinating, and tracking activities in education programs.

Some embodiments described herein may allow tracking activities in an education program. A service provider and at least one server receiver may be present in an activity. For example, an instructor and a student may be present in a particular activity. Management, coordination, and tracking of the activity may be performed on a mobile device. For example, the service provider may interact with the mobile device, causing the mobile device to manage and track the activity. In another example, the service provider may interact with the mobile device to start the activity, to supervise the activity, and to review and verify a summary of the activity. Depending on a configuration of the activity, the service receiver and the service provider may authenticate themselves to indicate their presence in the activity and to verify accuracy of the summary of the activity.

Some embodiments described herein may allow creating spatiotemporal activity records for the activities. The spatiotemporal activity records may include secure and durable electronic records associated with a service receiver. The spatiotemporal activity records may accurately and reliably track the service receiver's completion of course requirements in the education program. The spatiotemporal activity records and/or data included therein may be output, e.g., through a display device or through a printer, to the service provider or the service receiver to identify whether the service receiver has completed the course requirements and/or to identify which of the course requirements have been met and which have not been met. The spatiotemporal activity records thereby output to the service provider and/or the service receiver or other individuals may serve as documentation that verifies that various instructions, practicing of skills, recitations, and competency demonstrations for the program actually took place and that program requirements have been met.

Each spatiotemporal activity record may include a first reference to the service receiver, a second reference to the service provider, at least one accomplishment or error achieved in the activity (e.g., skills practiced in the activity, test requirements met in the activity, test requirements failed in the activity, mistakes made in the activity), one or more time/location indicators (e.g., a timestamp, a time period) about the activity in general that describe start and end times and durations for specific kinds of instruction, training, practicing of skills, or demonstrations of competency. Optionally, each spatiotemporal activity record may further include one or more time/location indicators that describe where the activity took place over time, plus when and where the accomplishments and errors occurred.

The spatiotemporal activity records of the activities may help instructors and schools to avoid law suits that question whether requisite trainings of the program actually took place. The spatiotemporal activity records may be beneficial for improving quality and consistency of the program, improving students and parents' engagement in the program, and/or reducing coordination and administrative costs for program management. The spatiotemporal activity records may provide a sound basis for conducting non-interfering and de-identified evaluations to determine program effectiveness.

Some embodiments described herein may also allow program staffs to set up definitions for courses in a program. A definition for a course may include, but is not limited to, class sessions, in-the-field activities (e.g., training or testing sessions that take place out of the class), and requirements for completion of the course (e.g., assessments, practice time requirement, practice of particular skills, demonstration of competencies, receipt of materials, activity attendance, and any other suitable requirements).

Some embodiments described herein may provide support to allow service receivers to register for a variety of courses and to schedule activities for different courses. For example, a service provider may help a service receiver to schedule a time for an activity using a mobile device. Alternatively, the service receiver may schedule a time for an activity online. The service receiver and/or a parent of the service receiver may assess a progress report that describes progress of the service receiver's performance in the program. The service receiver and/or the parent of the service receiver may receive activity reminders and/or notifications related to activity schedule changes.

Reference will now be made to the drawings to describe various aspects of some example embodiments of the invention. The drawings are diagrammatic and schematic representations of such example embodiments, and are not limiting of the present invention, nor are they necessarily drawn to scale.

FIG. 1A is a block diagram of an example operating environment 100 that includes a server 101, a client device 123, and a mobile device 111, arranged in accordance with at least some embodiments described herein. The server 101, the client device 123, and the mobile device 111 may cooperate with each other to manage, coordinate, and/or track activities in an education program. Although one server 101, one client device 123, and one mobile device 111 are illustrated in FIG. 1A, the operating environment 100 may more generally include one or more servers 101, one or more client devices 123, and one or more mobile devices 111. In some embodiments, the operating environment 100 may not include the client device 123. In these and other embodiments, the operating environment 100 may include other servers and/or devices not shown in FIG. 1A, such as a map server for providing a map service to the server 101 and/or the mobile device 111.

The operating environment 100 may additionally include a network 109. In general, the network 109 may include one or more wide area networks (WANs) and/or local area networks (LANs) that enable the server 101, the mobile device 111, and the client device 123 to communicate with each other. In some embodiments, the network 109 may include the Internet, including a global internetwork formed by logical and physical connections between multiple WANs and/or LANs. Alternately or additionally, the network 109 may include one or more cellular radio frequency (RF) networks and/or one or more wired and/or wireless networks such as, but not limited to, 802.xx networks, Bluetooth access points, wireless access points, Internet Protocol (IP)-based networks, or the like. For example, the network 109 may include a mobile data network such as third-generation (3G), fourth-generation (4G), long-term evolution (LTE), or any other mobile data network or combination of mobile data networks. In some embodiments, the network 109 may include a global positioning system (GPS) satellite for providing GPS navigation and/or locations to the mobile device 111. The network 109 may also include servers that enable one type of network to interface with another type of network.

In general, the server 101 may include a processor 103, a storage medium 105, and a communication interface 104. The processor 103 may be of any type including, but not limited to, a central processing unit (CPU), a microprocessor (μP), a microcontroller (μC), a digital signal processor (DSP), or any combination thereof. The processor 103 may be configured to execute computer instructions that, when executed, cause the processor 103 to perform or control performance of one or more of the operations described herein with respect to the server 101.

The storage medium 105 may include volatile memory such as random access memory (RAM), persistent or non-volatile storage including, but not limited to, read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. Accordingly, the storage medium 105 may include a non-transitory computer-readable medium. The storage medium 105 may store computer instructions that may be executed by the processor 103 to perform or control performance of one or more of the operations described herein with respect to the server 101.

The storage medium 105 may additionally store user data 107, education program data 127, activity record data 129a, and any other suitable data associated with the server 101. The education program data 127 may include data that describes one or more education programs. Example education programs may include, but are not limited to, a training program, a licensing program, a certification program, and any other suitable education programs. Each education program may include one or more courses and each course may include one or more class sessions and/or one or more in-the-field activities. An in-the-field activity may include a training session or a testing session that occurs out of the class. For example, an education program may include a driver education program with classroom instruction sessions and in-the-field activities (e.g., practice driving sessions, driving tests). Other examples of educations programs may include training for emergency responders, law enforcement professionals, and home-care professionals.

The education program data 127 may include one or more courses for each education program, corresponding class sessions for each course, corresponding activities for each course, corresponding services provided in each activity (e.g., skills taught in an activity, a test provided in an activity), requirements to pass the services provided in each activity (e.g., a practice time requirement for a skill taught in an activity, a requirement to pass a test provided in an activity), and/or any other data related to the education program.

The user data 107 may include profile data of one or more service providers that may provide services in an education program. For example, the one or more service providers may include one or more instructors in a driver education program. Additionally or alternatively, the user data 107 may include profile data of one or more service receivers that may receive the services in the education program. For example, the one or more service receivers may include one or more students in the driver education program. Additionally or alternatively, the user data 107 may include profile data of one or more individuals related to or otherwise associated with the service receivers. For example, the one or more individuals may include parents or guardians of the service receivers.

Figure 1B:
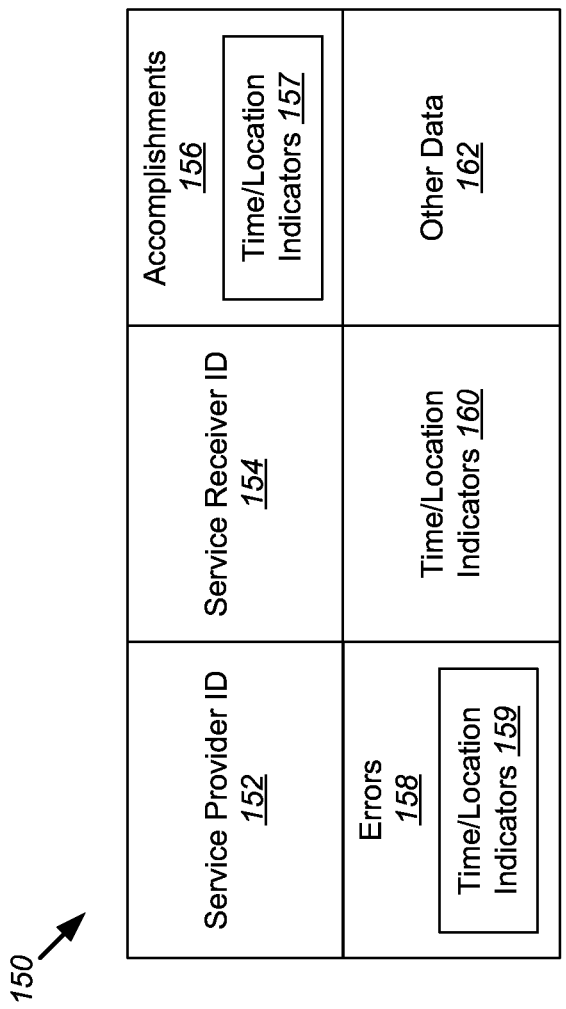
FIG. 1B illustrates an example spatiotemporal activity record.

The activity record data 129a may include data that describes spatiotemporal activity records associated with different activities for different service receivers in an education program. FIG. 1B illustrates an example spatiotemporal activity record 150 that may be included in or described by the activity record data 129a. The spatiotemporal activity record 150, and each spatiotemporal activity record in general, may be associated with an activity for a particular service receiver. As illustrated in FIG. 1B, the spatiotemporal activity record 150, and each spatiotemporal activity record in general, may include one or more of: (1) an identifier (ID) 152 of a service provider that provides services in the activity (e.g., an ID of an instructor), hereinafter "service provider ID 152"; (2) an ID 154 of the particular service receiver (e.g., an ID of a student), hereinafter "service receiver ID 154"; (3) a set of accomplishments 156 achieved in the activity by the particular service receiver (e.g., skills practiced in the activity, practice times of the skills, and/or test requirements met in the activity), hereinafter "accomplishments 156"; (4) a set of errors 158 achieved in the activity by the particular service receiver (e.g., mistakes made during the activity, test requirements that were failed in the activity), hereinafter "errors 158"; (5) a set of time/location indicators 160, hereinafter "time/location indicators 160"; and (6) any other suitable data 162 related to the activity, hereinafter "other data 162". The accomplishments 156 and the errors 158 may include time/location indicators 157 and 159 associated with the accomplishments 156 and errors 158.

Each of the time/location indicators 160, 157, and 159 may include a location point (e.g. global positioning system (GPS) coordinates or other location point) paired with a timestamp that indicates a time at which the service provider and the service receiver are at the location point.

The time/location indicators 160 may include time/location indicators captured throughout the activity that indicate the locations and corresponding times of the service provider and the service receiver throughout the activity. In an example configuration, the time/location indicators 160 may be generated at a default frequency, e.g., once per second, throughout the activity. Alternatively or additionally, the generation of new time/location indicators 160 may be optimized to reduce redundant data. For example, time-location indicators 160 may be generated at the default frequency or a relatively high frequency when the location of the service provider and the service receiver as a function of time is changing in a non-linear manner (e.g., while driving in the city in the example of the driver education program) and may be generated at a relatively lower frequency when the location of the service provider and the service receiver as a function of time is changing in a relatively linear manner (e.g., while driving on the freeway in the example of the driver education program).

Each of the time/location indicators 157 may include a location point paired with a timestamp that indicates a time at which the service receiver is at the location point where a corresponding one of the accomplishments 156 occurs. Analogously, each of the time/location indicators 159 may include a location point paired with a timestamp that indicates a time at which the service receiver is at the location point where a corresponding one of the errors 158 occurs.

Figure 1C:
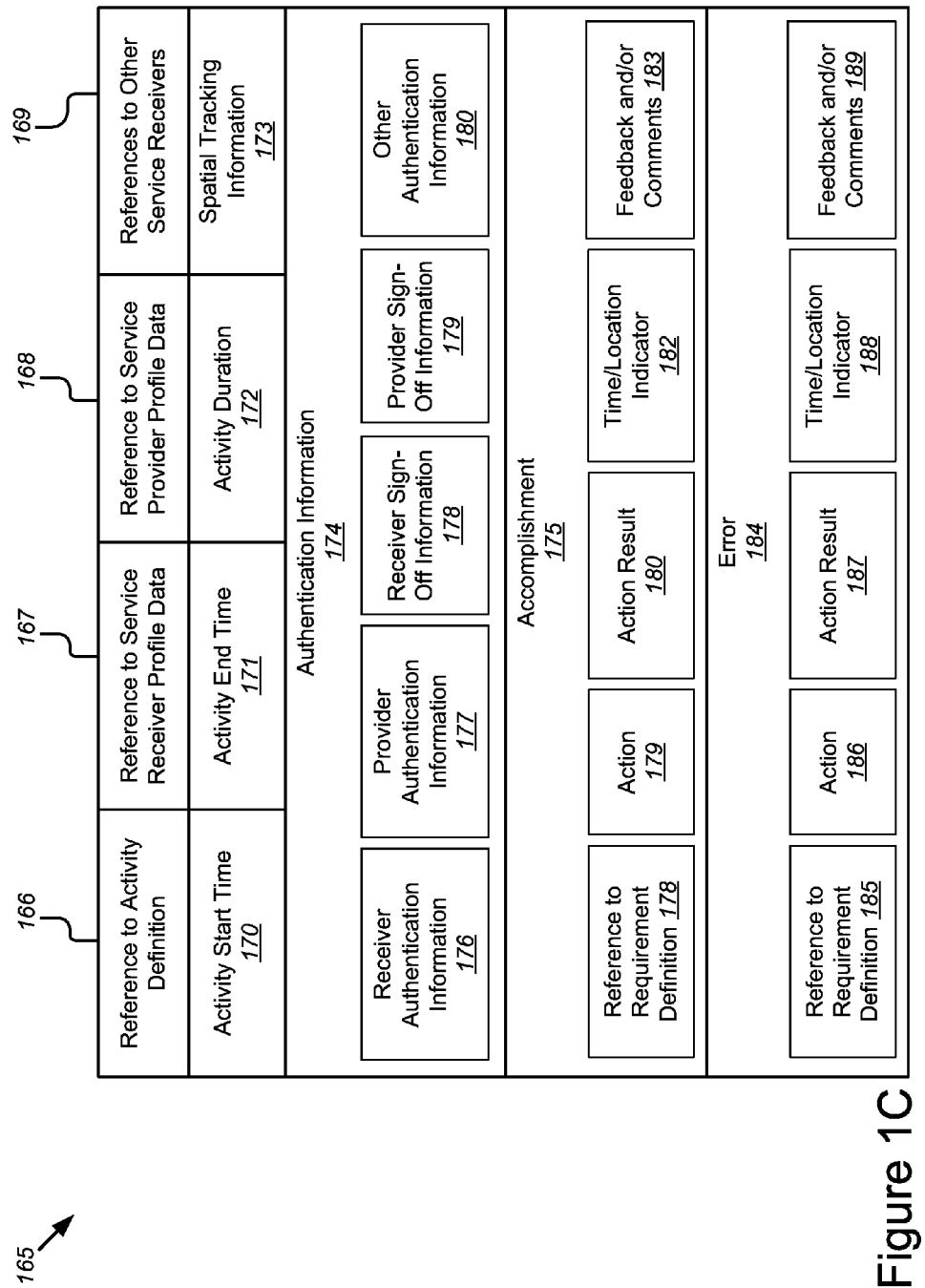
FIG. 1C illustrates another example spatiotemporal activity record.

FIG. 1C illustrates another example spatiotemporal activity record 165 that may be included in or described by the activity record data 129a. In some embodiments, the spatiotemporal activity record 165 may combine "time," "place" (or location), "user information," and "accomplishments" related to the activity together. For example, the spatiotemporal activity record 165 may include, but is not limited to: (1) a first reference 166 to a definition of the activity from a course's metadata (e.g., a link to the definition of the activity); (2) a second reference 167 to profile data of the service receiver (e.g., an ID of the service receiver or a link to the profile data of the service receiver); (3) a third reference 168 to profile data of the service provider (e.g., an ID of the service provider or a link to the profile data of the service provider); (4) a fourth references 169 to other service receivers that are present in the activity and observe the service receiver perform actions in the activity; (5) an activity start time 170 (e.g., a start date and time) which may optionally be paired with a corresponding location point; (6) an activity end time 171 (e.g., an end date and time) which may optionally be paired with a corresponding location point; (7) an activity duration 172 (e.g., a total active duration in minutes); (8) spatial tracking information 173 (e.g., time/location indicators such as the time/location indicators 160 of FIG. 1B which may collectively define a geo-location point, a path, a route, or an area where the activity occurs); (9) authentication information 174 of the service receiver and the service provider; and at least one of (10) one or more accomplishments 175 achieved in the activity or (11) one or more errors 184 made in the activity. In these and other embodiments, the spatiotemporal activity record 165 may include other suitable information related to the activity.

The authentication information 174 of the service receiver and the service provider may include, but is not limited to: (1) receiver authentication information 176 that may represent a sign-on event of the service receiver at the start of the activity, where the receiver authentication information may be used to indicate presence of the service receiver in the activity; (2) provider authentication information 177 that may represent a sign-on event of the service provider at the start of the activity, where the provider authentication information may be used to indicate presence of the service provider in the activity; (3) receiver sign off information 178 received at the end of the activity, which indicates the service receiver endorses a spatiotemporal activity record associated with the activity (e.g., the receiver sign off information may indicate that the service receiver has verified a summary of services provided in the activity, accomplishments and/or errors achieved/made in the activity, and when and where the accomplishments and/or errors occurred); (4) provider sign off information 179 received at the end of the activity, which indicates the service provider endorses the spatiotemporal activity record associated with the activity (e.g., the provider sign off information may indicate that the service provider has approved the summary of services provided in the activity, accomplishments and/or errors that the service receiver has achieved/made in the activity, and when and where the accomplishments and/or occurred); and (5) any other suitable authentication information 180.

In some embodiments, the receiver authentication information 176 may represent an authentication of the service receiver at a particular time and a particular location associated with the start of the activity. For example, the receiver authentication information 176 may include an encrypted portion of data and an unencrypted portion of data. The encrypted portion of data may include a reference to the service receiver, a date and time, identification data of the service receiver, a geo-location associated with the start of the activity, and a nonce. The identification data of the service receiver may include, e.g., a signature entered through a touchscreen or other suitable interface such as a signature entered through the interface using a finger (hereinafter a "finger signature") or a stylus (hereinafter a "stylus signature"), a personal identification number (pin), a fingerprint, swiping of a card, a scan of a bar code, a retinal scan, a voice recognition, and any other suitable identification data. The unencrypted portion of data may include a hash code.

Similarly, the provider authentication information 177 may represent an authentication of the service provider at the particular time and the particular location associated with the start of the activity. For example, the provider authentication information 177 may include an encrypted portion of data and an unencrypted portion of data. The encrypted portion of data may include a reference to the service provider, a date and time, identification data of the service provider (e.g., a signature, a pin, a fingerprint, swiping of a card, a scan of a bar code, a retinal scan, a voice recognition, and any other suitable identification data), a geo-location associated with the start of the activity, and a nonce. The unencrypted portion of data may include a hash code.

The accomplishment 175 in the spatiotemporal activity record 165 may include, but is not limited to: (1) a reference 178 to a definition for a requirement of the activity from the course's metadata; (2) an action 179 performed in the activity: (3) a result 180 of the action 179 (e.g., the action 179 successfully completes the requirement of the activity); (4) a time/location indicator 182 that describes when and where the accomplishment 175 occurs; and (5) feedback and/or comments 183 related to the accomplishment 175 from the service provider (e.g., strength and/or weakness identified by the service provider for the action performed by the service receiver). In these and other embodiments, the accomplishment 175 may include any other suitable data related to the accomplishment 175.

The error 184 in the spatiotemporal activity record 165 may include, but is not limited to: (1) a reference 185 to a definition for a requirement of the activity from the course's metadata; (2) an action 186 performed in the activity: (3) a result 187 of the action 186 (e.g., the action 186 fails to satisfy or is contrary to the requirement of the activity); (4) a time/location indicator 188 that describes when and where the error 184 occurs; and (5) feedback and/or comments 189 related to the error 184 from the service provider (e.g., strength and/or weakness identified by the service provider for the action performed by the service receiver). In these and other embodiments, the error 184 may include any other suitable data related to the error 184.

Returning to FIG. 1A, the communication interface 104 of the server 101 may provide any suitable form of communication capability between the server 101 and one or more of the client device 123 and the mobile device 111 via the network 109, including wired and/or wireless communication capability. For example, the communication interface 104 may include a wireless-fidelity (Wi-Fi) card for providing Wi-Fi connectivity. By way of example and not limitation, the communication interface 104 may be configured to provide, via wireless mechanisms, LAN connectivity, Bluetooth connectivity, Wi-Fi connectivity, near field communication (NFC) connectivity, Machine-to-Machine (M2M) connectivity, Device-to-Device (D2D) connectivity, any other suitable communication capability, or any suitable combination thereof. In these and other embodiments, the communication interface 104 may provide direct connectivity between the server 101 and one or more of the client device 123 and the mobile device 111. In some embodiments, the communication interface 104 may include a transmitter and/or a receiver for providing any suitable form of communication capability described herein.

The mobile device 111 may include a mobile computing device that includes a processor 113, a storage medium 115, and a communication interface 117. For example, the mobile device 111 may include a laptop computer, a tablet computer, a mobile telephone, a personal digital assistant ("PDA"), a mobile e-mail device, a portable game player, a portable music player, a wearable device, or another mobile electronic device with a processor and a memory. A service provider may interact with the mobile device 111 during an activity. For example, the service provider may use the mobile device 111 to track the activity, to generate a spatiotemporal activity record for the activity and to send the spatiotemporal activity record to the server 101. Alternatively, the service provider may use the mobile device 111 to track the activity and to send a tracking result to the server 101. The server 101 may create the spatiotemporal activity record based on the tracking result received from the mobile device 111.

Similar to the processor 103 of the server 101, the processor 113 may be of any type including, but not limited to, a CPU, a µP, a µC, a DSP, or any combination thereof. The processor 113 may be configured to execute computer instructions that, when executed, cause the processor 113 to perform or control performance of one or more of the operations described herein with respect to the mobile device 111.

Similar to the storage medium 105 of the server 101, the storage medium 115 may include volatile memory such as RAM, persistent or non-volatile storage including, but not limited to, ROM, EEPROM, CD-ROM or other optical disk storage, magnetic disk storage or other magnetic storage device, NAND flash memory or other solid state storage device, or other persistent or non-volatile computer storage medium. Accordingly, the storage medium 105 may include a non-transitory computer-readable medium. The storage medium 115 may store computer instructions that may be executed by the processor 113 to perform or control performance of one or more of the operations described herein with respect to the mobile device 111.

In some embodiments, the storage medium 115 may store activity record data 129b. The activity record data 129b may include data that describes one or more spatiotemporal activity records for one or more service receivers present in a particular activity. For example, for a practice driving session with presence of two students, the activity record data 129b may include a first spatiotemporal activity record for a first student and a second spatiotemporal activity record for a second student. In some embodiments, the first spatiotemporal activity record for the first student and the second spatiotemporal activity record for the second student may be combined to form a single spatiotemporal activity record for the practice driving session. The activity record data 129b may be uploaded to the server 101 and may form part of the activity record data 129a. Each of the spatiotemporal activity record(s) included in the activity record data 129b of FIG. 1A may be implemented according to the spatiotemporal activity record 150 of FIG. 1B and/or the spatiotemporal activity record 165 of FIG. 1C.

The communication interface 117 may provide any suitable form of communication capability between the mobile device 111 and one or more of the server 101 and the client device 123 via the network 109, including wired and/or wireless communication capability. For example, the communication interface 117 may include a Wi-Fi card for providing Wi-Fi connectivity. By way of example and not limitation, the communication interface 117 may be configured to provide, via wireless mechanisms, LAN connectivity, Bluetooth connectivity, Wi-Fi connectivity, NFC connectivity, M2M connectivity, D2D connectivity, any other suitable communication capability, or any suitable combination thereof. In these and other embodiments, the communication interface 117 may provide direct connectivity between the mobile device 111 and one or more of the server 101 and the client device 123. In some embodiments, the communication interface 117 may include a transmitter and/or a receiver for providing any suitable form of communication capability described herein.

The client device 123 may include a computing device that includes a memory and a processor, for example, a laptop computer, a desktop computer, a tablet computer, a mobile telephone, a PDA, a mobile e-mail device, a portable game player, a portable music player, a wearable device, a television with one or more processors embedded therein or coupled thereto, or another electronic device capable of accessing the network 109. The mobile device 111 may be an example implementation of the client device 123. In some embodiments, a staff of an education program may operate the client device 123 to configure courses in the education program, activities in the courses, requirements for course completions, and/or any other data related to the education program.

Figure 2:
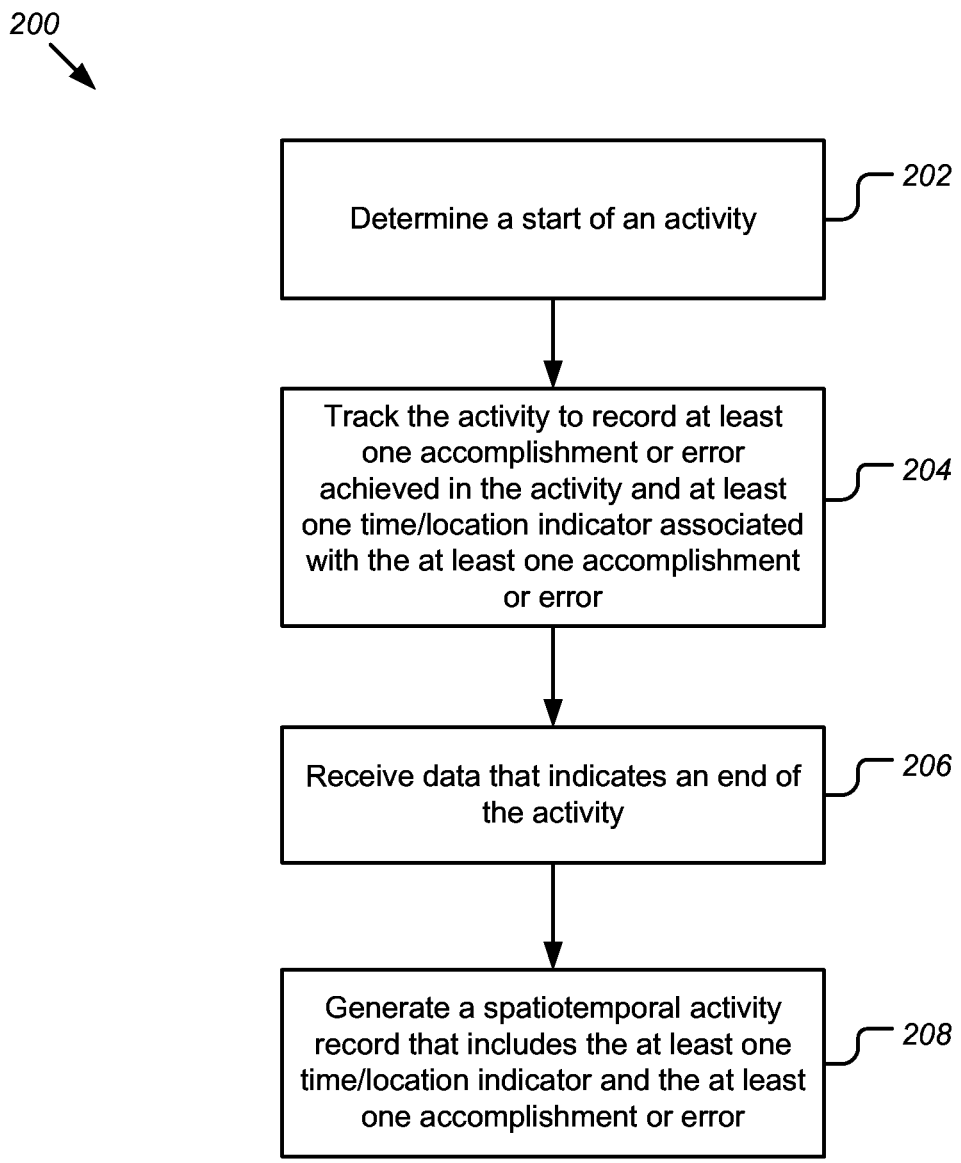
FIG. 2 shows an example flow diagram of a method of creating a spatiotemporal activity record for an activity in an education program.

FIG. 2 shows an example flow diagram of a method 200 of creating a spatiotemporal activity record for an activity in an education program, arranged in accordance with at least some embodiments described herein. The method 200 may be performed in whole or in part by, e.g., the mobile device 111, the server 101, and/or the client device 123 of FIG. 1A. Although illustrated as discrete blocks, various blocks may be divided into additional blocks, combined into fewer blocks, or eliminated, depending on the desired implementation. Various examples that involve a driver education program will be provided in association with the blocks of the method 200 of FIG. 2 with the understanding that the method 200 may be applied in any education program and is not limited to a driver education program.

The method 200 may begin at block 202 in which a start of an activity may be determined. The activity may include a hands-on training session or a testing session of an education program. For example, the activity may include a practice driving session, a range session, a driving test session, or any other suitable in-the-field activity. A service provider and a service receiver may participate in the activity. For example, an instructor and a student may be present in a practice driving session during which the instructor may instruct the student how to drive a vehicle. Alternatively, more than one service receiver and/or more than one service provider may participate in the activity. In some embodiments, the service provider may interact with the mobile device 111 to select an activity and to press a start button to start the activity. The activity may be started responsive to a selection of the activity and/or a selection of the start button from the service provider. The service provider and/or the service receiver may be authenticated at the start of the activity. An example method 300 of determining a start of an activity is described below with reference to FIG. 3.

At block 204, the activity may be tracked to record at least one accomplishment or error achieved by the service receiver in the activity and at least one time/location indicator associated with the at least one accomplishment or error. A corresponding time/location indicator may be recorded for each accomplishment and/or error. In some embodiments, each of the at least one accomplishment or error may describe what the service receiver has done and how the service receiver has performed in the activity. For example, each of the at least one accomplishment or error may include: (1) a corresponding action that the service receiver takes in the activity; and (2) a corresponding result of the action. In a further example, each of the at least one accomplishment or error may include a driving skill that the service receiver has practiced in the activity, a result from the skill practice, a mistake made by the service receiver during the skill practice, a required action the service receiver failed to take during the activity, a prohibited action the service receiver took during the activity, or some other accomplishment or error. The at least one time/location indicator may describe when and where the at least one accomplishment or error occurred.

For example, in a practice driving session the service receiver may perform two actions, where a first action may describe that the service receiver practices driving a vehicle and a second action may describe that the service receiver practices a three-point turn. A first time indicator associated with the first action may be recorded to include a time period (e.g., from 3:00 PM to 4:00 PM, Sep. 10, 2014) during which the service receiver is behind the wheel. A second time indicator associated with the second action may be recorded to include a timestamp (e.g., 3:20 PM, Sep. 10, 2014) that indicates when the service receiver practices the three-point turn. A first location indicator associated with the first action may be recorded to include a driving path along which the service receiver drives the vehicle. A second location indicator associated with the second action may be recorded to include a location in the driving path where the service receiver practices the three-point turn. A first accomplishment associated with the first action may be recorded to describe that the service receiver successfully practices driving during the time period indicated by the first time indicator and along the driving path indicated by the first location indicator. A second accomplishment associated with the second action may be recorded to describe that the service receiver successfully practices the three-point turn at the timestamp indicated by the second indicator and at the location indicated by the second location indicator.

An example method 400 of tracking an activity is described below with reference to FIGS. 4A-4C.

At block 206, data that indicates an end of the activity may be received. For example, the service provider may interact with the mobile device 111 to select a "Finish" button or an equivalent button presented on the mobile device 111. A selection of the "Finish" button or an equivalent button may indicate that the activity ends.

At block 208, a spatiotemporal activity record associated with the activity may be generated for the service receiver. The spatiotemporal activity record may include the at least one time/location indicator and the at least one accomplishment or error achieved in the activity. In some embodiments, the spatiotemporal activity record may include a reference to a requirement associated with the activity in the education program, and the at least one accomplishment or error may include data that indicates whether the at least one accomplishment or error satisfies or fails to satisfy the requirement. The spatiotemporal activity record may be implemented as described above with respect to FIG. 1B and/or FIG. 1C.

In some embodiments, the method 200 may additionally include aggregating and presenting a summary of the activity for review at the end of the activity. The summary may be presented to the service provider and/or the service receiver through, e.g., a display of the mobile device 111. Presenting the summary to the service provider and the service receiver may inform both the service provider and the service receiver about the service receiver's progress in the course. The method 200 may include receiving review data from the service provider and/or the service receiver. For example, the service provider and/or the service receiver may modify and/or sign off on the summary of the activity. The summary of the activity may include the spatiotemporal activity record. The service provider and/or the service receiver may digitally sign off on the summary of the activity. For example, the service provider and/or the service receiver may sign his or her name on a user interface provided on the mobile device 111. The service provider and/or the service receiver may sign off on the summary as an indication that, e.g., the service provider and/or the service receiver has reviewed and understands the summary. Alternatively or additionally, each of the service provider and the service receiver may provide his or her identification data (e.g., a signature, a pin, a fingerprint, or another type of identification data) to authenticate himself or herself and to sign off on the summary of the activity after reviewing the summary of the activity. A reviewer may be authenticated as the service receiver or the service provider in response to the identification data received from the reviewer matching identification data of the service receiver or the service provider. Authenticated identification data may be requested and/or required from the service provider and/or the service receiver when they sign off on the spatiotemporal activity record and/or the summary to establish the identities of each of the service provider and/or the service receiver and to ensure the spatiotemporal activity record qualifies as a legal record of what took place in the activity.

The method 200 may additionally include verifying the summary of the activity that includes the spatiotemporal activity record based on one or more of the review data received from the service provider and/or the service receiver, a digital signature from the service provider, a digital signature from the service receiver, authentication information of the service receiver, and/or authentication information of the service provider at the end of the activity. The verification may include verification that the summary of the activity, e.g., the spatiotemporal activity record, has been reviewed and approved by the service provider or the service receiver in response to authenticating the reviewer as the service receiver or the service provider.

In some embodiments, the method 200 may additionally include uploading the spatiotemporal activity record to the server 101 and storing the spatiotemporal activity record as part of the activity record data 129a in the storage medium 105. Alternatively or additionally, the method 200 may include presenting to a service receiver a list of courses and/or requirements of a given education program which have been satisfied by the service receiver and/or which still need to be satisfied by the service receiver to complete the education program, which information may be based on the spatiotemporal activity records that have been recorded for the service receiver.

One example use of the method 200 may include tracking a practice driving session in a driver education course and creating a spatiotemporal activity record for the practice driving session. The spatiotemporal activity record may include an activity start time (e.g., a driving start time when a service receiver such as a student starts to sit behind the wheel or is at least present in the vehicle with other students), an activity end time (e.g., a driving end time), and a driving duration (e.g., an amount of time that the student is actually driving). The driving duration may not be equal to the difference between the driving end time and the driving start time, since a service provider such as an instructor may request the student to pause driving from time to time during the practice driving session. For example, the instructor may ask the student to pull the vehicle over to a side of a road in order to explain a particular driving skill in more detail. The spatiotemporal activity record may additionally include time/location indicators that indicate a route as a function of time along which the student drives the vehicle. The spatiotemporal activity record may also include receiver authentication information for authenticating the student and provider authentication information for authenticating the service provider at the start and/or the end of the practice driving session. Additionally, the spatiotemporal activity record may include a set of accomplishments and/or errors achieved by the student in the practice driving session, where each accomplishment or error may include a corresponding time/location indicator and instruction feedback from the instructor. For example, an accomplishment may describe that the student has successfully practiced parallel parking three times at a particular parking lot between 2:00 PM and 2:20 PM, Sep. 10, 2014. As another example, an error may describe that the student failed to use a turn signal before making a turn or that the student exceeded a speed limit.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Some embodiments disclosed herein include an article of manufacture such as a non-transitory computer storage medium having instructions stored thereon that are executable by a computing device to perform or control performance of operations included in the method 200 of FIG. 2, such as the operations illustrated by blocks 202, 204, 206, and/or 208 in FIG. 2, and/or variations thereof. The non-transitory computer storage medium may be included in or may be accessible to the mobile device 111, the client device 123, and/or the server 101 of FIG. 1A, such as the storage medium 115 and/or the storage medium 105. The computing device may include the mobile device 111, the client device 123, or the server 101.

Figure 3:
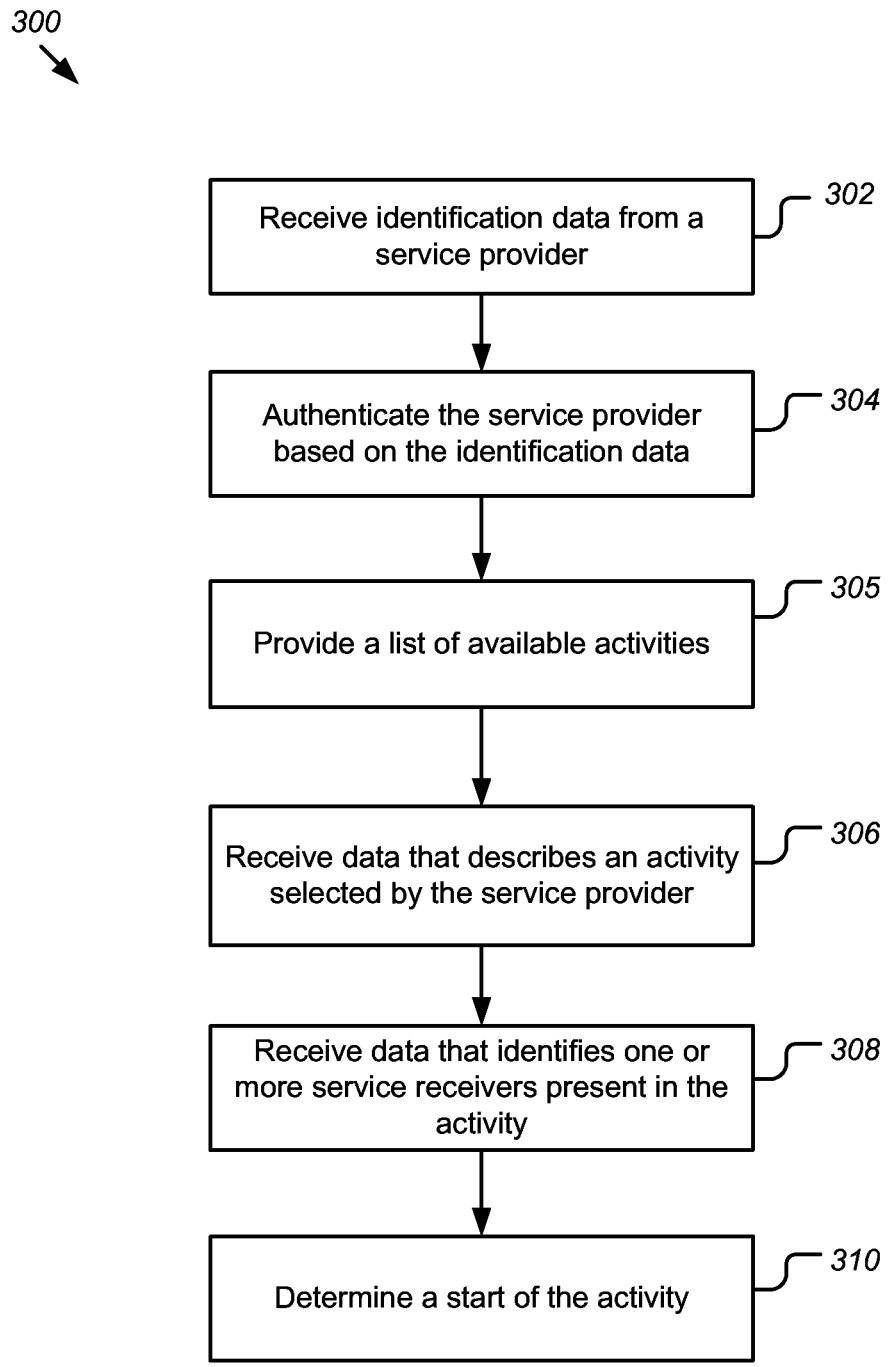
FIG. 3 shows an example flow diagram of a method of determining a start of an activity.

FIG. 3 shows an example flow diagram of a method 300 of determining a start of an activity, arranged in accordance with at least some embodiments described herein. The method 300 may be performed in whole or in part by, e.g., the server 101, the client device 123, and/or the mobile device 111 of FIG. 1A. Although illustrated as discrete blocks, various blocks may be divided into additional blocks, combined into fewer blocks, or eliminated, depending on the desired implementation.

The method 300 may begin at block 302 in which identification data from a service provider may be received. For example, the service provider may provide a signature, a pin number, a thumb scan, and/or any other suitable identification data via a user interface presented on the mobile device 111. The service provider may use the identification data to sign on the activity.

At block 304, the service provider may be authenticated based on the identification data.

At block 305, a list of available activities may be provided to the service provider. In some embodiments, a most likely activity may be determined based on a current time and a current location, and the most likely activity may be provided to the service provider as a default activity.

At block 306, the method 300 may include receiving data that describes an activity selected by the service provider. For example, the service provider may select the default activity using the mobile device 111. Alternatively, the service provider may browse the list of available activities presented on the mobile device 111 and may select an activity from the list of available activities.

At block 308, the method 300 may include receiving data that identifies one or more service receivers present in the activity. For example, a list of service receivers that are scheduled to be involved in the selected activity may be presented to the service provider. The service provider may mark whether a particular service receiver in the list is present or absent in the activity. Additionally, the service provider may add one or more additional service receivers to the list on the fly and may mark presence of the one or more additional service receivers.

At block 310, a start of the activity may be determined. For example, the activity may be determined to start responsive to a selection of the activity. Alternatively, the activity may be determined to start responsive to a selection of a start button by the service provider.

In some embodiments, the method 300 may additionally include authenticating the one or more service receivers present in the activity based on a configuration of the activity. For example, if the configuration of the activity requests the one or more service receivers to authenticate themselves at the beginning of the activity, the one or more service receivers may respectively provide identification data to authenticate themselves via a user interface presented on the mobile device 111.

Some embodiments disclosed herein include an article of manufacture such as a non-transitory computer storage medium having instructions stored thereon that are executable by a computing device to perform operations included in the method 300 of FIG. 3, such as the operations illustrated by blocks 302, 304, 305, 306, 308, and/or 310 in FIG. 3, and/or variations thereof. The non-transitory computer storage medium may be included in or may be accessible to the server 101, the mobile device 111, and/or the client device 123 of FIG. 1A, such as the storage medium 105 and/or the storage medium 115. The computing device may include a processor or other processing device of the server 101, the mobile device 111, or the client device 123.

Figure 4A:
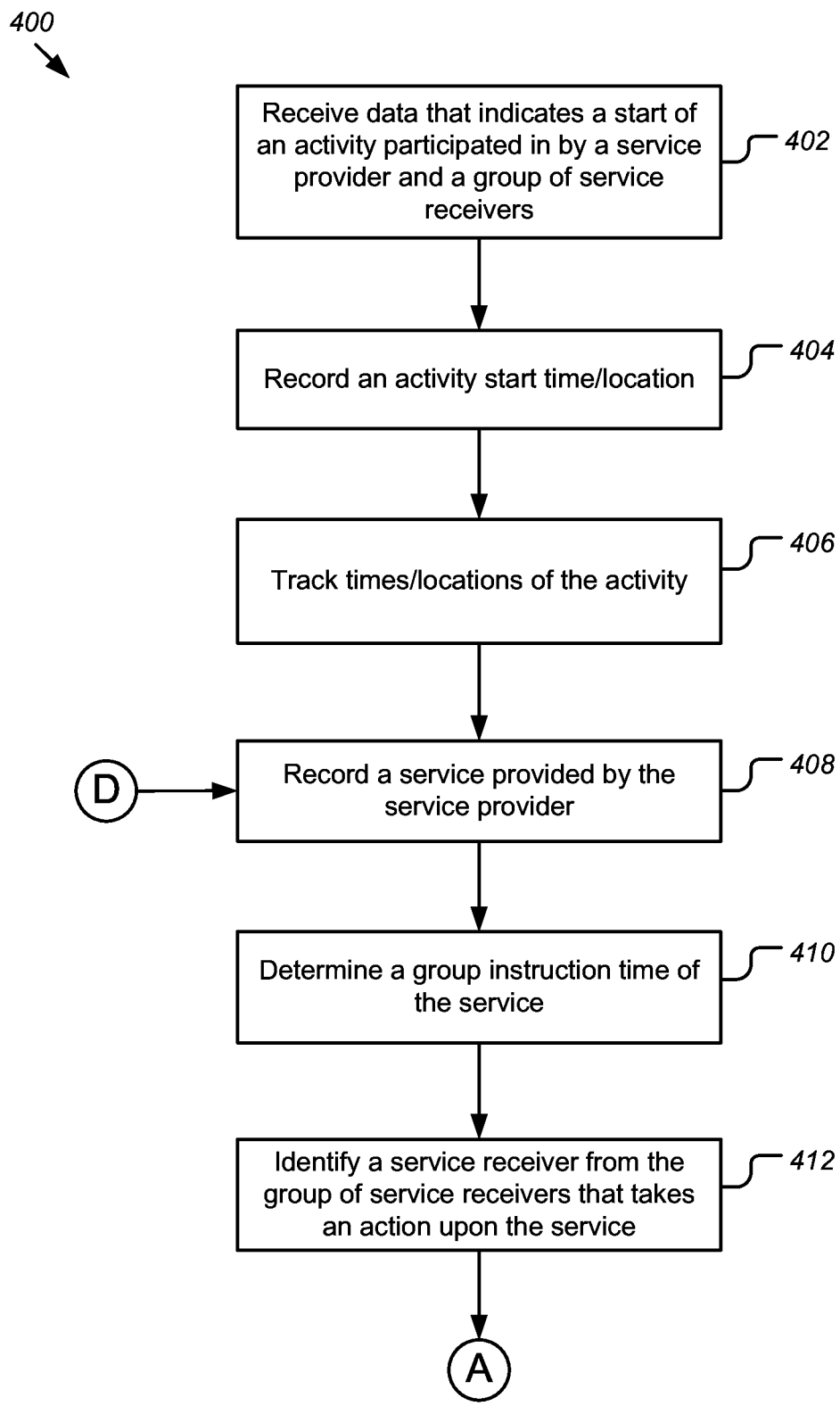
FIGS. 4A-4C show an example flow diagram of a method of tracking an activity.
Figure 4B:
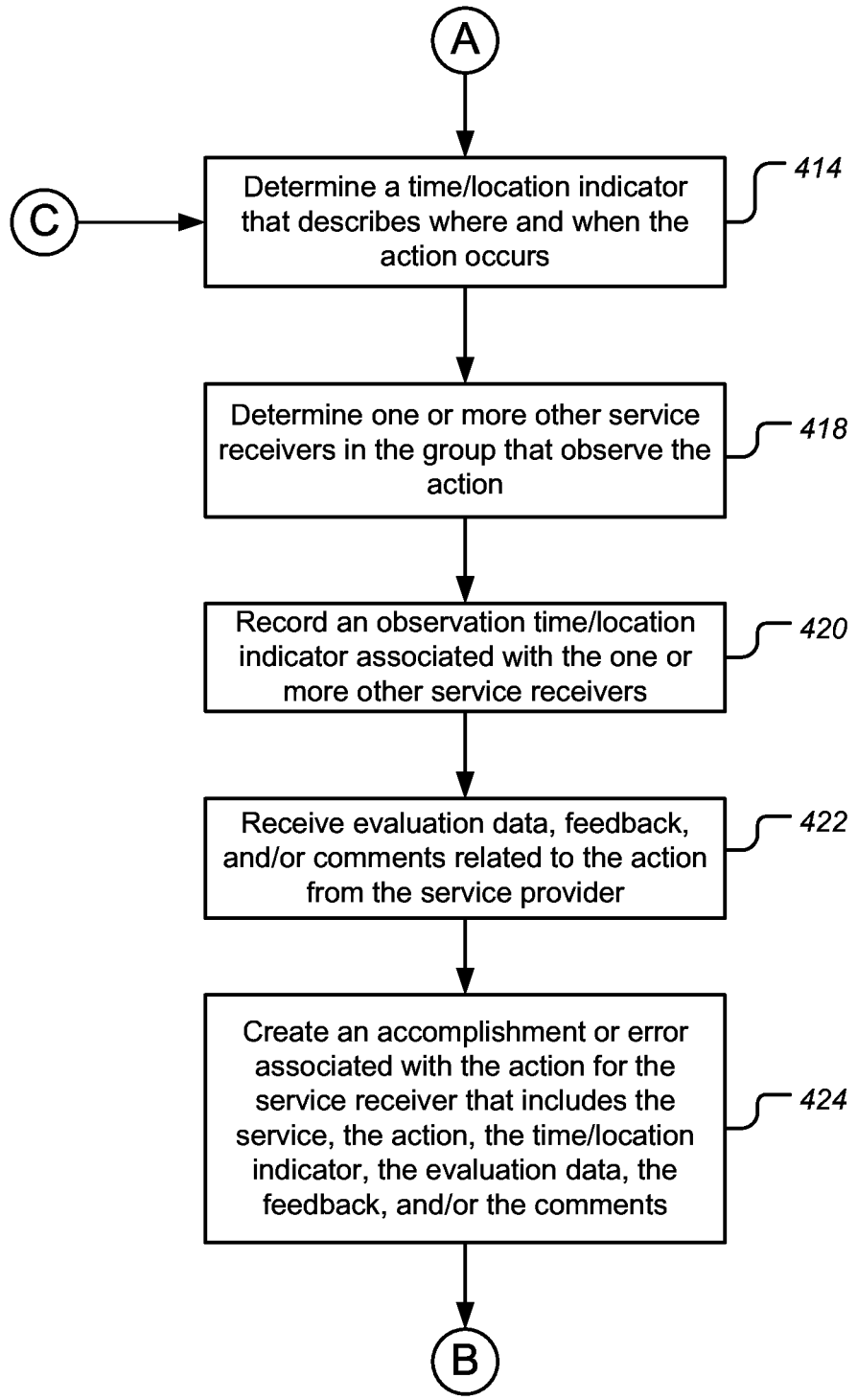
Figure 4C:
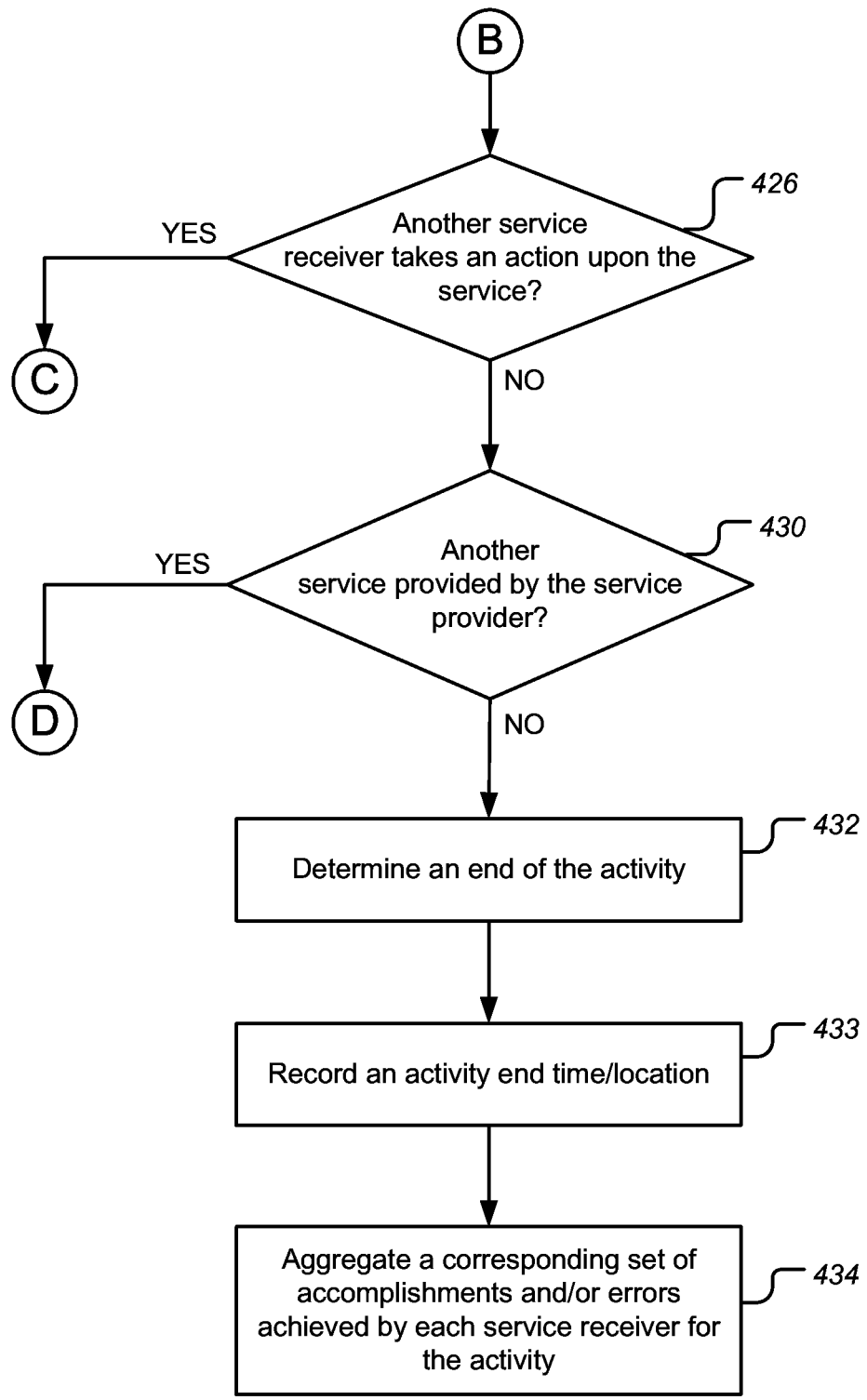

FIGS. 4A-4C show an example flow diagram of a method 400 of tracking an activity, arranged in accordance with at least some embodiments described herein. The method 400 may be performed in whole or in part by, e.g., the mobile device 111, the server 101, and/or the client device 123 of FIG. 1A and includes some overlap with blocks 204, 206 and 208 of FIG. 2. Although illustrated as discrete blocks, various blocks may be divided into additional blocks, combined into fewer blocks, or eliminated, depending on the desired implementation.

Referring to FIG. 4A, the method 400 may begin at block 402 in which data that indicates a start of an activity may be received. The activity may be participated in by a service provider and a group of service receivers. The group of service receivers may include one or more service receivers. In some embodiments, the service provider may interact with the mobile device 111 to track the activity.

At block 404, an activity start time and/or location may be recorded.

At block 406, the method 400 may include tracking times/locations of when and where the activity takes place. Tracking times/locations may include generating and recording time/location indicators during the activity, such as the time/location indicators 160 of FIG. 1B.

At block 408, a service provided by the service provider may be recorded. For example, the service provider may instruct the group of service receivers how to perform parallel parking in a practice driving session. The service provider may mark a parallel parking practice in a checklist of services and the method 400 may record that the service provider has instructed the parallel parking skill to the group of service receivers. The checklist of services for the practice driving session may include parallel parking practice, U-turn practice, left turn practice, right turn practice, three-point turn practice, and any other driving skill practice that the service provider may provide instructions to the group of service receivers. More generally, the checklist of services may include services that correspond to a session of any education program.

At block 410, a group instruction time of the service may be determined. For example, a group instruction time period during which the service provider explains the parallel parking skill to the group of service receivers may be determined. In another example, the service provider may mark a start time and an end time of the group instruction. The method 400 may determine the group instruction time as a time period between the start time and the end time of the group instruction.

At block 412, the method 400 may include identifying a service receiver from the group of service receivers that takes an action upon the service. For example, the service provider may mark, via a user interface presented on the mobile device 111, an ID of the service receiver that currently sits behind the wheel and practices parallel parking in the practice driving session. The method 400 may determine the ID of the service receiver from the marking of the service provider.

Referring to FIG. 4B, at block 414, a time/location indicator that describes when and where the action occurs (or fails to occur) may be determined, which time/location indicator may correspond to one of the time/location indicators 157 or 159 of FIG. 1B. For example, a geo-location and timestamp that indicate when and where the service receiver practices the parallel parking skill may be determined using a GPS signal from a GPS sensor installed on the mobile device 111. In another example, the service provider may pinpoint a location of the action on a user interface displayed on the mobile device 111, which location may be paired with a timestamp indicating a time at which the action occurs.

At block 418, one or more other service receivers in the group that observe the action performed by the service receiver may be determined. For example, other service receivers in the group except the service receiver may observe the action performed by the service receiver. However, if the group of service receivers only includes the service receiver, no other service receiver is present in the activity to observe the action.

At block 420, an observation time/location indicator associated with the one or more other service receivers may be recorded. For example, the observation time/location indicator may be the same as the time/location indicator that describes where and when the action occurs.

At block 422, evaluation data, feedback, and/or comments related to the action may be received from the service provider. For example, the service provider may mark a performance of the action (e.g., passed, failed, requirement met, or any other result) and may provide feedback and/or comments to point out strength and/or weakness of the action performed by the service receiver.

At block 424, an accomplishment or error associated with the action may be created for the service receiver. The accomplishment or error may include the service instructed by the service provider, the action performed (or failed to be performed) by the service receiver, the time/location indicator associated with the action, the evaluation data, the feedback, the comments, and/or any other data related to the action.

Referring to FIG. 4C, at block 426, the method 400 may include determining whether there is another service receiver in the group that takes an action upon the service. If there is another service receiver that takes an action upon the service, the method 400 may return to block 414 of FIG. 4B and repeat blocks 414, 418, 420, 422, and/or 424 for the other service receiver. Otherwise, the method 400 may move to block 430.

At block 430, the method 400 may include determining whether there is another service provided by the service provider. If there is another service provided by the service provider, the method 400 may return to block 408 of FIG. 4A and repeat one or more of the blocks 410, 412, 414, 418, 420, 422, 424, and 426 in view of the other service. For example, after all the service receivers in the group have practiced the parallel parking skill, the service provider may instruct the U-turn skill to the group of service receivers, which may be recorded at block 408. The method 400 may then move to block 410 of FIG. 4A to record a group instruction time for the U-turn skill and continue with the other blocks 412, 414, 418, 420, 422, 424, and/or 426.

If there is not another service provided by the service provider at block 430, the method 400 may move to block 432. At block 432, an end of the activity may be determined.

At block 433, an activity end time and/or location may be recorded responsive to determining the end of the activity.

At block 434, a corresponding set of accomplishments and/or errors achieved by each service receiver may be aggregated for the activity. A spatiotemporal activity record may be generated for each of the service receivers that includes the set of accomplishments and/or errors achieved by each service receiver, or a single spatiotemporal activity record may be generated that includes the aggregated set of accomplishments and/or errors of the service receivers.

Some embodiments disclosed herein include an article of manufacture such as a non-transitory computer storage medium having instructions stored thereon that are executable by a computing device to perform operations included in the method 400 of FIGS. 4A-4C, such as the operations illustrated by blocks 402, 404, 406, 408, 410, 412, 414, 416, 418, 420, 422, 424, 426, 430, 432, 433, and/or 434 in FIGS. 4A-4C, and/or variations thereof. The non-transitory computer storage medium may be included in or may be accessible to the mobile device 111, the client device 123, and/or the server 101 of FIG. 1A, such as the storage medium 115 and/or the storage medium 105. The computing device may include the mobile device 111, the client device 123, or the server 101.

Figure 5:
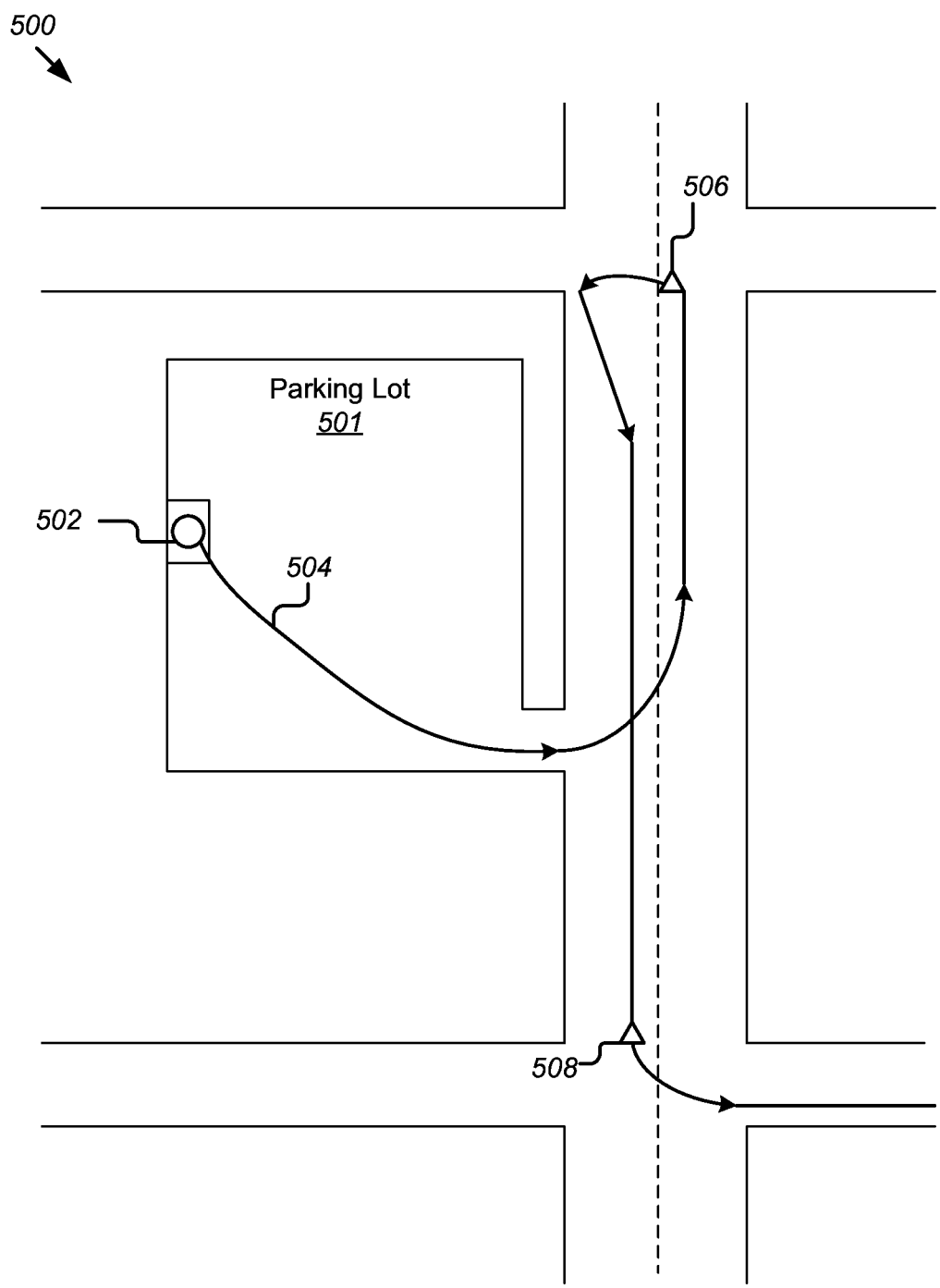
FIG. 5 is a graphic representation that illustrates an example driving session activity.

FIG. 5 is a graphic representation 500 that illustrates an example driving session activity, in accordance with at least some embodiments described herein. At a location 502 in a parking lot 501, a service provider (e.g., an instructor) and a service receiver (e.g., a student) may authenticate themselves by providing their respective pin numbers to the mobile device 111. The service provider may start the driving session by selecting a start button on a user interface displayed on the mobile device 111. An activity start time and/or location may be recorded by the mobile device 111. A location of a vehicle used in the driving session activity as a function of time may be tracked by the mobile device 111 by recording time/location indicators throughout the driving session activity. The service receiver may sit behind the wheel and may drive the vehicle along a route 504.

The service receiver may practice a U-turn at a location 506 along the route 504. A first accomplishment that describes the U-turn practice may be recorded. The first accomplishment may also include a time/location indicator that describes a time when and the location 506 where the service receiver practices the U-turn.

The service receiver may practice a left turn at a location 508 along the route 504. A second accomplishment that describes practice of the left turn may be recorded. The second accomplishment may also include a time/location indicator that describes a time when and the location 508 where the service receiver practices the left turn.

A spatiotemporal activity record may be generated for the service receiver. The spatiotemporal activity record may include a first reference to the service receiver, a second reference to the service provider, authentication information of the service provider and the service receiver, the route 504 as a function of time (which may be represented by time/location indicators recorded throughout the driving session activity), the first and second accomplishments, and any other suitable information related to the driving session activity.

Figure 6:
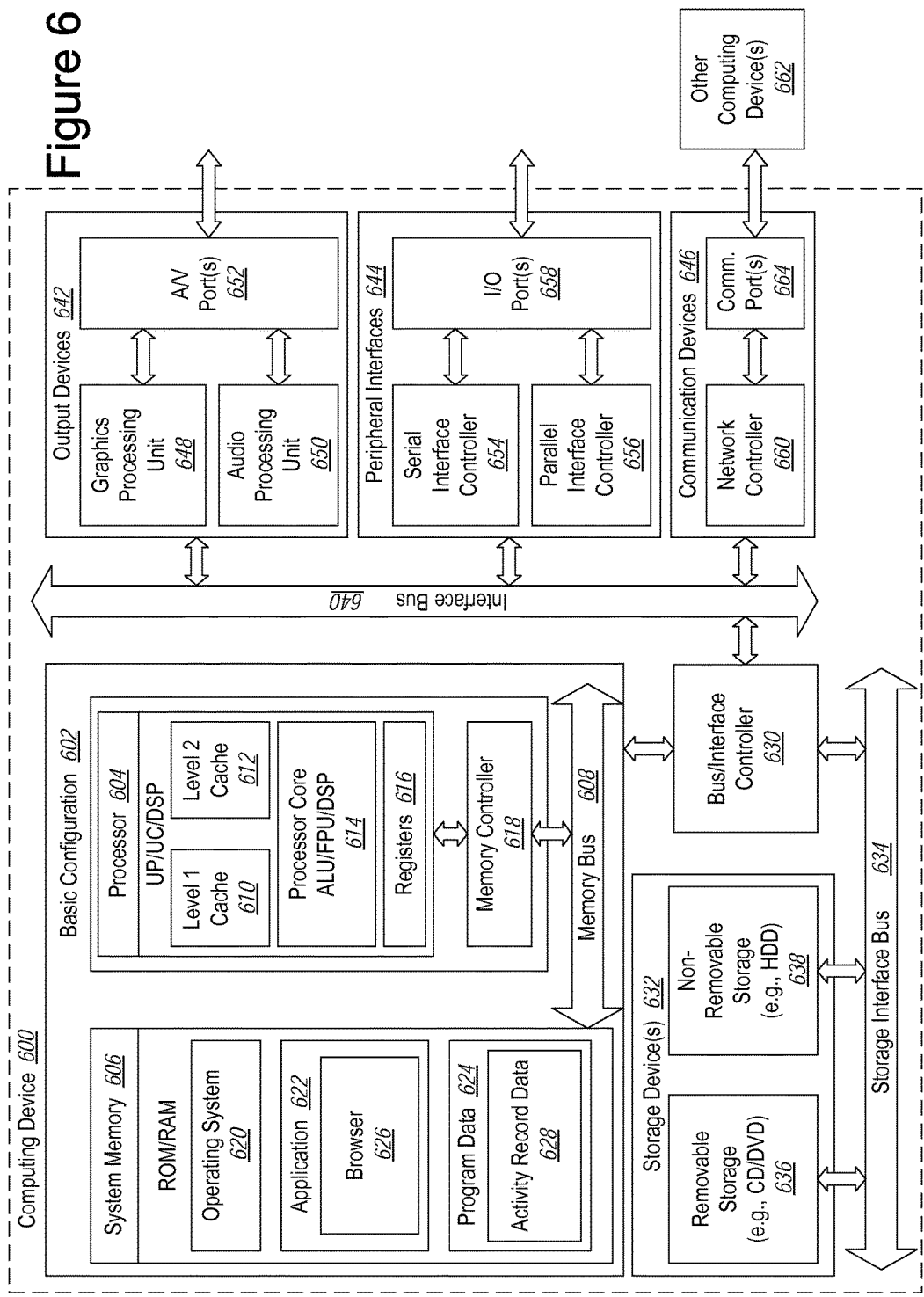
FIG. 6 is a block diagram that illustrates an example computing device arranged for managing, coordinating, and tracking activities in an education program.

FIG. 6 is a block diagram that illustrates an example computing device 600 arranged for managing, coordinating, and tracking activities in an education program, in accordance with at least some embodiments described herein. The computing device 600 may be included in or correspond to any of the mobile device 111, the client device 123, and/or the server 101 of FIG. 1A, for example. In a very basic configuration 602, the computing device 600 may typically include one or more processors 604 and a system memory 606. A memory bus 608 may be used for communicating between the processor 604 and the system memory 606.

Depending on the desired configuration, the processor 604 may be of any type including, but not limited to, a CPU, a μP, a μC, a DSP, or any combination thereof. The processor 604 may include one or more levels of caching, such as a level one cache 610 and a level two cache 612, a processor core 614, and registers 616. The example processor core 614 may include an arithmetic logic unit (ALU), a floating point unit (FPU), a digital signal processing core (DSP core), or any combination thereof. An example memory controller 618 may also be used with the processor 604, or in some implementations the memory controller 618 may be an internal part of the processor 604.

Depending on the desired configuration, the system memory 606 may be of any type including, but not limited to, volatile memory (such as RAM), non-volatile memory (such as ROM, flash memory), or any combination thereof. The system memory 606 may include an operating system (OS) 620, one or more applications 622, and program data 624. The application 622 may include a browser 626, an app, an application server, or other application that may be arranged to perform one or more of the functions as described herein including those described with respect to the methods 200, 300, and/or 400 of FIGS. 2-4. The program data 624 may include activity record data 628 that may be pulled into the application 622 for analysis on one of the mobile device 111, the server 101, and the client device 123 of FIG. 1A, for example. In some embodiments, the application 622 may be arranged to operate with the program data 624 on the OS 620 such that implementations of methods for creating spatiotemporal activity records, determining a start of an activity, and/or tracking an activity, such as the methods 200, 300, and 400 of FIGS. 2-4, may be provided as described herein.

The computing device 600 may have additional features or functionality, and additional interfaces to facilitate communications between the basic configuration 602 and any required devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer-readable instructions, data structures, program modules, or other data.

The system memory 606, removable storage devices 636, and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., output devices 642, peripheral interfaces 644, and communication devices 646) to the basic configuration 602 via the bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device) or other peripheral devices (e.g., printer, scanner) via one or more I/O ports 658. The example communication device 646 may include a network controller 660, which may be arranged to facilitate communications with one or more other computing devices 662 over a network communication link via one or more communication ports 664.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media as used herein may include both storage media and communication media.

The computing device 600 may be implemented as a portion of a small-form factor portable (or mobile) electronic device such as a cell phone, a personal data assistant (PDA), a personal media player device, a wireless web-watch device, a personal headset device, an application-specific device, or a hybrid device that includes any of the above functions. The computing device 600 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to create spatiotemporal activity records for an education program, the method comprising:
   determining a start of a vehicular driving activity of a service receiver;
   tracking, by a computing device, the vehicular driving activity to record at least one accomplishment or error achieved in the vehicular driving activity and one or more time/location indicators associated with the at least one accomplishment or error, the tracking including determining whether a location of the service receiver is changing as a function of time in a manner indicative of city driving or freeway driving;
   adaptively sampling, by the computing device, the one or more time/location indicators based on the manner in which the location of the service receiver is changing as a function of time, including sampling the time-location indicators at a first sampling rate when the location of the service receiver is changing as a function of time in a manner indicative of city driving and sampling the time-location indicators at a second sampling rate when the location of the service receiver is changing as a function of time in a manner indicative of freeway driving, wherein the first sampling rate is higher than the second sampling rate and wherein the at least one accomplishment or error corresponds to at least one of the adaptively sampled one or more time/location indicators;
   generating, by the computing device, a spatiotemporal activity record that includes each of the one or more time/location indicators adaptively sampled during an entire duration of the vehicular driving activity and the at least one accomplishment or error;
   presenting at least a portion of the spatiotemporal activity record for review by a reviewer;
   receiving identification data of the reviewer as an indication that the reviewer has reviewed and understands the at least the portion of the spatiotemporal activity record;
   authenticating the reviewer as the service receiver in response to the identification data received from the reviewer matching identification data of the service receiver;
   verifying the spatiotemporal activity record as reviewed and approved by the service receiver in response to authenticating the reviewer as the service receiver; and
   based on the verified spatiotemporal activity records, performing one or both of:
      presenting to the service receiver a list of satisfied requirements and unsatisfied requirements in an education program; and
      storing the verified spatiotemporal activity records such that a quality and consistency of the education program is reviewable.

2. The method of claim 1, wherein:
   the service receiver is a first service receiver;
   the at least one accomplishment or error is achieved by the first service receiver and supervised by a service provider; and
   the spatiotemporal activity record further includes a first reference to the first service receiver and a second reference to the service provider.

3. The method of claim 2, wherein:
   the at least one accomplishment or error is observed by a second service receiver; and
   the spatiotemporal activity record further includes a third reference to the second service receiver.

4. The method of claim 1, wherein determining the start of the vehicular driving activity further comprises:
   receiving identification data associated with a service provider;
   authenticating the service provider present in the vehicular driving activity based on the identification data associated with the service provider;
   receiving data that identifies one or more service receivers present in the vehicular driving activity;
   receiving data that describes a selection of the vehicular driving activity by the service provider; and
   determining the start of the vehicular driving activity responsive to the selection of the vehicular driving activity.

5. The method of claim 1, wherein the identification data of the reviewer includes a finger signature of the reviewer, a personal identification number (pin) of the reviewer, or a fingerprint of the reviewer.

6. The method of claim 1, wherein:
   the vehicular driving activity includes a driving session; and
   the at least one accomplishment or error includes one or more driving skills practiced in the vehicular driving activity and one or more practice results for the one or more driving skills.

7. The method of claim 1, wherein:
   the spatiotemporal activity record includes a reference to a requirement associated with the vehicular driving activity in the education program;
   the at least one accomplishment or error includes at least one accomplishment; and
   the at least one accomplishment includes data that indicates that the at least one accomplishment satisfies the requirement.

8. An article of manufacture comprising a non-transitory computer storage medium having computer instructions stored thereon that are executable by a computing device to perform operations comprising:

determining a start of a vehicular driving activity of a service receiver;
tracking the vehicular driving activity to record at least one accomplishment or error achieved in the vehicular driving activity and one or more time/location indicators associated with the at least one accomplishment or error, the tracking including determining whether a location of the service receiver is changing as a function of time in a manner indicative of city driving or freeway driving;
adaptively sampling the one or more time/location indicators based on the manner in which the location of the service receiver is changing as a function of time, including sampling the time-location indicators at a first sampling rate when the location of the service receiver is changing as a function of time in a manner indicative of city driving and sampling the time-location indicators at a second sampling rate when the location of the service receiver is changing as a function of time in a manner indicative of freeway driving, wherein the first sampling rate is higher than the second sampling rate and wherein the at least one accomplishment or error corresponds to at least one of the adaptively sampled one or more time/location indicators;
generating a spatiotemporal activity record that includes each of the one or more time/location indicators adaptively sampled during an entire duration of the vehicular driving activity and the at least one accomplishment or error;
presenting at least a portion of the spatiotemporal activity record for review by a reviewer;
receiving identification data of the reviewer as an indication that the reviewer has reviewed and understands the at least the portion of the spatiotemporal activity record;
authenticating the reviewer as the service receiver in response to the identification data received from the reviewer matching identification data of the service receiver;
verifying the spatiotemporal activity record as reviewed and approved by the service receiver in response to authenticating the reviewer as the service receiver; and
based on the verified spatiotemporal activity records, performing one or both of:
 presenting to the service receiver a list of satisfied requirements and unsatisfied requirements in an education program; and
 storing the verified spatiotemporal activity records such that a quality and consistency of the education program is reviewable.

9. The article of manufacture of claim 8, wherein:
the service receiver is a first service receiver;
the at least one accomplishment or error is achieved by the first service receiver and supervised by a service provider; and
the spatiotemporal activity record further includes a first reference to the first service receiver and a second reference to the service provider.

10. The article of manufacture of claim 9, wherein:
the at least one accomplishment or error is observed by a second service receiver; and
the spatiotemporal activity record further includes a third reference to the second service receiver.

11. The article of manufacture of claim 8, wherein determining the start of the vehicular driving activity further comprises:

receiving identification data associated with a service provider;
authenticating the service provider present in the vehicular driving activity based on the identification data associated with the service provider;
receiving data that identifies one or more service receivers present in the vehicular driving activity;
receiving data that describes a selection of the vehicular driving activity by the service provider; and
determining the start of the vehicular driving activity responsive to the selection of the vehicular driving activity.

12. The article of manufacture of claim 8, wherein the identification data of the reviewer includes a finger signature of the reviewer, a personal identification number (pin) of the reviewer, or a fingerprint of the reviewer.

13. The article of manufacture of claim 8, wherein:
the vehicular driving activity includes a driving session; and
the at least one accomplishment or error includes one or more driving skills practiced in the vehicular driving activity and one or more practice results for the one or more driving skills.

14. The article of manufacture of claim 8, wherein:
the spatiotemporal activity record includes a reference to a requirement associated with the vehicular driving activity in the education program;
the at least one accomplishment or error includes at least one accomplishment; and
the at least one accomplishment includes data that indicates that the at least one accomplishment satisfies the requirement.

15. A system to create spatiotemporal activity records for an education program, the system comprising:
a processor; and
a memory storing instructions that, in response to execution by the processor, cause the processor to:
 determine a start of a vehicular driving activity of a service receiver;
 track the vehicular driving activity to record at least one accomplishment or error achieved in the vehicular driving activity and one or more time/location indicators associated with the at least one accomplishment or error, the tracking including determining whether a location of the service receiver is changing as a function of time in a manner indicative of city driving or freeway driving;
 adaptively sample the one or more time/location indicators based on the manner in which the location of the service receiver is changing as a function of time, including sample the time-location indicators at a first sampling rate when the location of the service receiver is changing as a function of time in a manner indicative of city driving and sample the time-location indicators at a second sampling rate when the location of the service receiver is changing as a function of time in a manner indicative of freeway driving, wherein the first sampling rate is higher than the second sampling rate and wherein the at least one accomplishment or error corresponds to at least one of the adaptively sampled one or more time/location indicators; and
 generate a spatiotemporal activity record that includes each of the one or more time/location indicators adaptively sampled during an entire duration of the vehicular driving activity and the at least one accomplishment or error;

present at least a portion of the spatiotemporal activity record for review by a reviewer;

receive identification data of the reviewer as an indication that the reviewer has reviewed and understands the at least the portion of the spatiotemporal activity record;

authenticate the reviewer as the service receiver in response to the identification data received from the reviewer matching identification data of the service receiver;

verify the spatiotemporal activity record as reviewed and approved by the service receiver in response to authenticating the reviewer as the service receiver; and based on the verified spatiotemporal activity records, perform one or both of:

present to the service receiver a list of satisfied requirements and unsatisfied requirements in an education program; and store the verified spatiotemporal activity records such that a quality and consistency of the education program is reviewable.

16. The system of claim 15, wherein:

the service receiver is a first service receiver;

the at least one accomplishment or error is achieved by the first service receiver and supervised by a service provider; and the spatiotemporal activity record further includes a first reference to the first service receiver and a second reference to the service provider.

17. The system of claim 16, wherein:

the at least one accomplishment or error is observed by a second service receiver; and the spatiotemporal activity record further includes a third reference to the second service receiver.

18. The system of claim 15, wherein in response to execution by the processor, the instructions cause the processor to determine the start of the vehicular driving activity by:

receiving identification data associated with a service provider;

authenticating the service provider present in the vehicular driving activity based on the identification data associated with the service provider;

receiving data that identifies one or more service receivers present in the vehicular driving activity;

receiving data that describes a selection of the vehicular driving activity by the service provider; and determining the start of the vehicular driving activity responsive to the selection of the vehicular driving activity.

19. The system of claim 15, wherein the identification data of the reviewer includes a finger signature of the reviewer, a personal identification number (pin) of the reviewer, or a fingerprint of the reviewer.

20. The system of claim 15, wherein:

the vehicular driving activity includes a driving session; and the at least one accomplishment or error includes one or more driving skills practiced in the vehicular driving activity and one or more practice results for the one or more driving skills.

* * * * *